United States Patent
Yamamoto (10) Patent No.: US 7,061,141 B2
(45) Date of Patent: Jun. 13, 2006

(54) PARALLEL OPERATION METHOD FOR AN UNINTERRUPTIBLE POWER SUPPLY APPARATUS

(75) Inventor: Yuushin Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 539 days.

(21) Appl. No.: 10/237,081

(22) Filed: Sep. 9, 2002

(65) Prior Publication Data

US 2003/0184160 A1 Oct. 2, 2003

(30) Foreign Application Priority Data

Mar. 28, 2002 (JP) ............................. 2002-091333

(51) Int. Cl.
*H02M 7/00* (2006.01)
(52) U.S. Cl. .......................................... 307/65; 307/71
(58) Field of Classification Search .................. 307/65, 307/71
See application file for complete search history.

(56) References Cited

U.S. PATENT DOCUMENTS 6,018,204 A * 1/2000 Kuruma ...................... 307/64
6,292,379 B1 * 9/2001 Edevold et al. ................ 363/71
2002/0109410 A1 * 8/2002 Young et al. .................. 307/64

OTHER PUBLICATIONS

"The Transactions on Institute of Electrical Engineers of Japan", vol. 107-D, No. 11, Nov. 1987, A Publication of Industry Applications Society.

* cited by examiner

*Primary Examiner*—Brian Sircus
*Assistant Examiner*—Daniel J. Cavallari
(74) *Attorney, Agent, or Firm*—Leydig, Voit & Mayer, Ltd.

(57) ABSTRACT

A method for parallel non-redundancy operation of uninterruptible power supply apparatuses having a bypass circuit without using an additional common circuit. In the method of operating in parallel uninterruptible power supply apparatuses, each apparatus has two operational modes, a bypass feeding mode and an inverter feeding mode. An off-instruction for an AC switch that is turned on in the bypass feeding mode of one of the uninterruptible power supply apparatuses is produced in the respective uninterruptible power supply apparatuses when operated in the inverter feeding mode. The off-instruction is produced based on detection of coincidence of a bypass feeding signal which is active during the bypass feeding mode and a ready signal which becomes active when the inverter feeding mode is ready.

4 Claims, 8 Drawing Sheets

PARALLEL OPERATION METHOD FOR AN UNINTERRUPTIBLE POWER SUPPLY APPARATUS

BACKGROUND OF THE INVENTION

1. Field of the Invention

The present invention relates to a parallel operation method for an uninterruptible power supply apparatus.

2. Description of the Related Art

Figure 6:
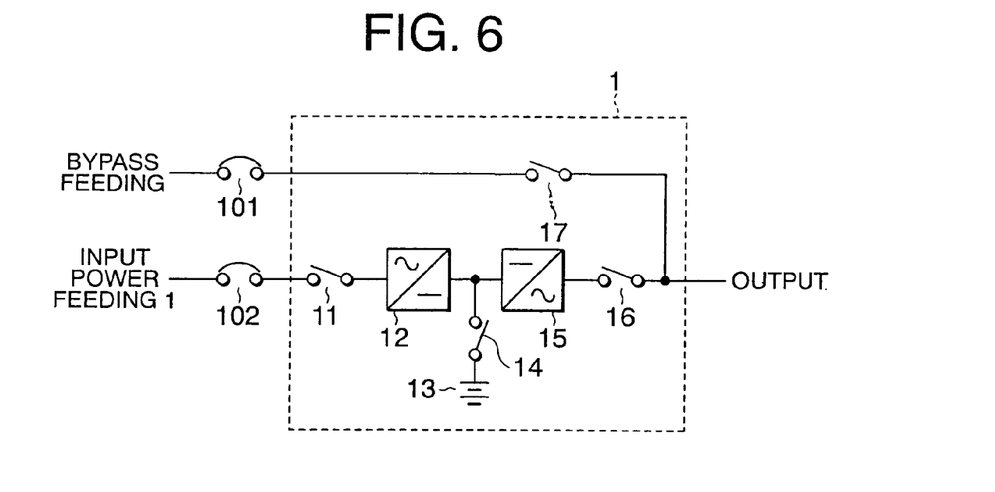
FIG. 6 is a block diagram showing a conventional uninterruptible power supply apparatus.

FIG. 6 is a block diagram showing the same structure as the fundamental structure of an uninterruptible power supply apparatus described in "Journal of the Institute of Electrical Engineers of Japan, Publication of Industry Applications Society (D), vol. 107, No. 11, p. 1312". An uninterruptible power supply apparatus 1 shown in FIG. 6 is constructed such that power is fed in a bypass feeding through a circuit breaker 101 and power is also fed from an input power supply through a circuit breaker 102. The apparatus 1 includes an AC switch 17 connected in the bypass feeding through the circuit breaker 101; a switch 11; a converter 12 which is connected to the input power supply through the circuit breaker 102 and the switch 11 to convert AC power into DC power; a battery 13; a switch 14; an inverter 15 for converting DC power into AC power; and a switch 16.

Next, operation thereof will be described. When the input power supply is normally operated, the converter 12 converts AC power into DC power through the circuit breaker 102 and the switch 11, and supplies the DC power to the inverter 15, while charging the battery 13 through the switch 14. The inverter 15 outputs AC power through the switch 16. On the other hand, when the input power supply is interrupted, the converter 12 is stopped, and the inverter 15 outputs AC power using power in the battery 13.

Figure 7:
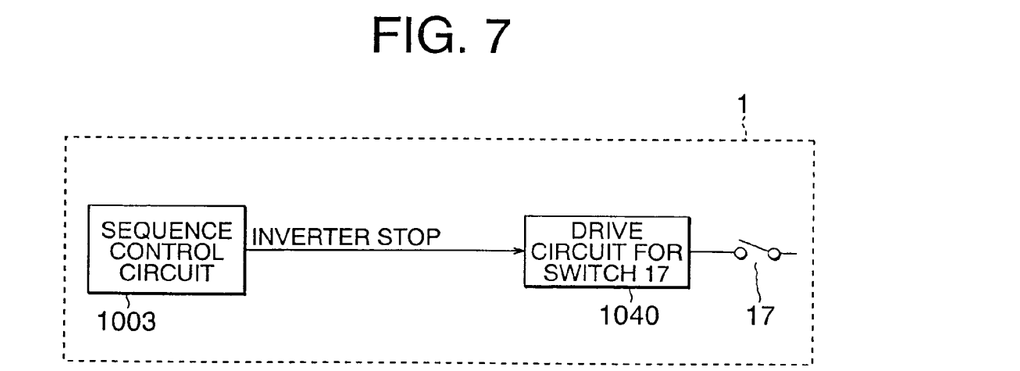
FIG. 7 is a block diagram relating to AC switch drive for the conventional uninterruptible power supply apparatus.

When the inverter 15 is stopped in a normal manner, stopped by an overload, or stopped by a failure, the AC switch 17 is turned on so that power is fed in the bypass feeding to a load. FIG. 7 shows a control circuit for the AC switch 17, which is composed of a sequence control circuit 1003 and a switch drive circuit 1040 and incorporated in the uninterruptible power supply apparatus 1 having the structure shown in FIG. 6. The operation of the AC switch 17 will be described with reference to FIG. 7. As shown in FIG. 7, the AC switch 17 is constructed to be turned on when an inverter feeding stop signal received from the sequence control circuit 1003 is received by the switch drive circuit 1040 to stop inverter feeding. Thus, even when the inverter 15 has failed, power can be continuously fed to the load.

Figure 8:
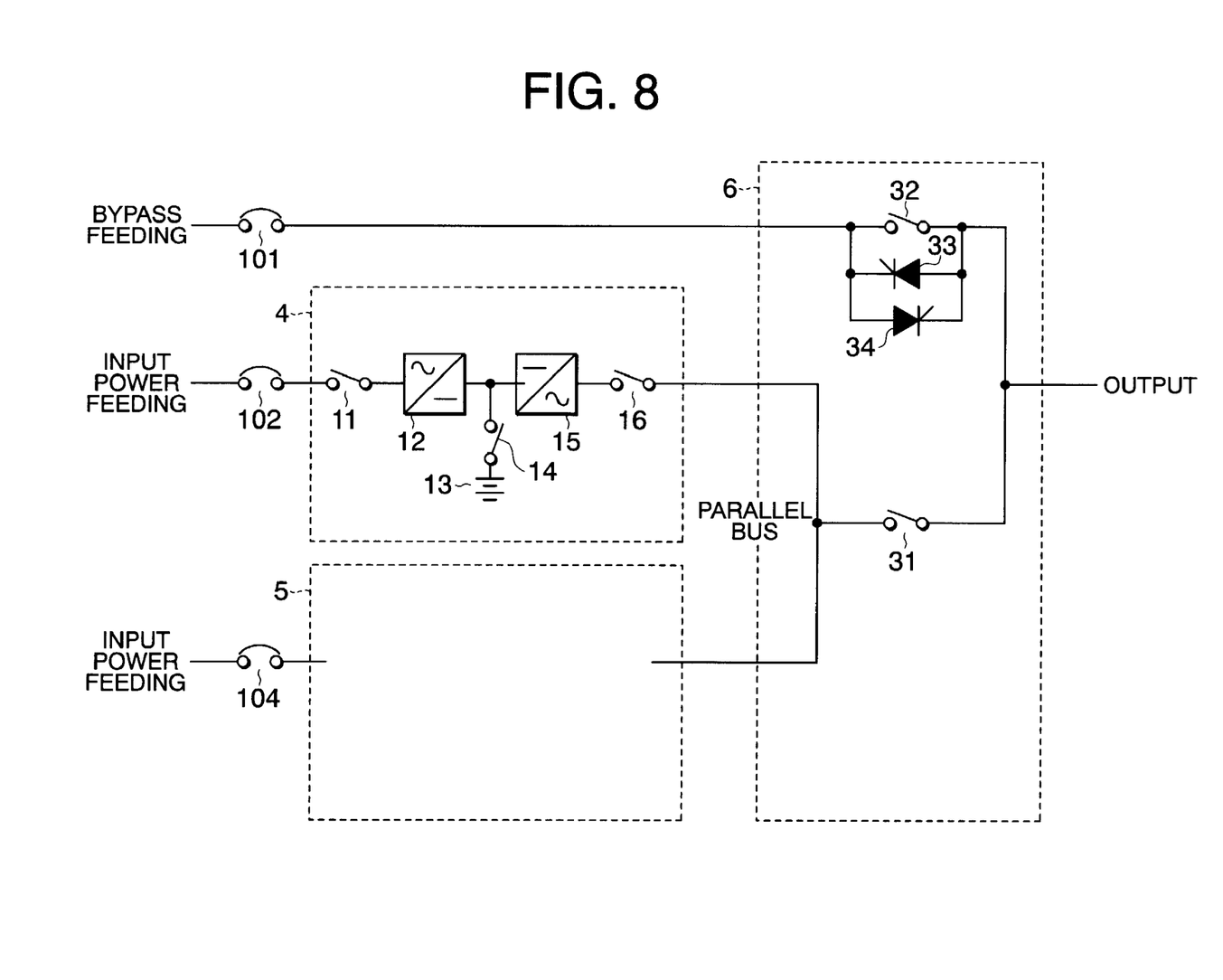
FIG. 8 is a block diagram relating to a parallel system of the conventional uninterruptible power supply apparatus.

In order to improve power feeding reliability of such an uninterruptible power supply apparatus or to increase output capacity thereof, parallel operation is conducted and the structure as shown in FIG. 8 is used in many cases. A parallel operation apparatus for the uninterruptible power supply apparatus as shown in FIG. 8 includes parallel uninterruptible power supply apparatuses 4 and 5. For example, when a load is within 100 kVA, rated capacity of the uninterruptible power supply apparatuses 4 and 5, which are operated in parallel, is set to 100 kVA. Thus, when at least one apparatus is operated, it becomes a redundant structure capable of supplying power to the load without interruption, which is called parallel redundancy. A difference between the uninterruptible power supply apparatus 1 shown in FIG. 6 and the parallel uninterruptible power supply apparatuses 4 and 5 shown in FIG. 8 is as follows. That is, although the uninterruptible power supply apparatus 1 includes the bypass feeding and the AC switch 17 for supplying power in the bypass feeding to the load when power feeding to the

2 inverter is stopped, the parallel uninterruptible power supply apparatuses 4 and 5 do not include the bypass input and the AC switch.

According to the structure shown in FIG. 8, a switching panel 6, to which the outputs of the parallel uninterruptible power supply apparatuses 4 and 5 and the power from the bypass feeding are input, is provided. Power is fed in the bypass feeding to the load when power cannot be fed from any of the parallel uninterruptible power supply apparatuses 4 and 5. In the switching panel 6, the outputs of the parallel uninterruptible power supply apparatuses 4 and 5 are connected to each other to produce a parallel bus. Generally, the outputs of the parallel uninterruptible power supply apparatuses 4 and 5 are supplied to the load through a switch 31. When the power cannot be fed from any of the parallel uninterruptible power supply apparatuses 4 and 5, the switch 31 is turned off and power is fed from the bypass feeding to the load through semiconductor switches 33 and 34 and a switch 32.

Also, when the load is within 100 kVA at an initial installation of the uninterruptible power supply apparatus, the uninterruptible power supply apparatus 4, of the parallel uninterruptible power supply apparatuses 4 and 5, and the switching panel 6 are connected. When an additional load is provided and exceeds 100 kVA, the uninterruptible power supply apparatus 5 is added so that power feeding can be conducted for a load capacity of up to 200 kVA. Thus, when the output capacity is increased by the parallel operation, it is not a redundant structure and called parallel non-redundancy.

In the case of the parallel non-redundancy, according to the structure shown in FIG. 8, since the switching panel 6 is provided, to which the outputs of the parallel uninterruptible power supply apparatuses 4 and 5 and the power from the bypass feeding are input, when power cannot be fed from either of the parallel uninterruptible power supply apparatuses 4 and 5, the parallel uninterruptible power supply apparatus is brought into an overload state. Thus, since both apparatuses are finally in a stopped state, power is fed from the bypass feeding to the load. In the switching panel 6, the outputs of the parallel uninterruptible power supply apparatuses 4 and 5 are connected to each other to produce the parallel bus. Generally, the outputs of the parallel uninterruptible power supply apparatuses are supplied to the load through the switch 31. When the power cannot be fed from any of the parallel uninterruptible power supply apparatuses 4 and 5, the switch 31 is turned off and power is fed in the bypass feeding to the load through the semiconductor switches 33 and 34 and the switch 32.

In the conventional parallel operation apparatus for an uninterruptible power supply apparatus, the power feeding reliability can be improved or the output capacity can be increased. However, when such an uninterruptible power supply apparatus having no bypass circuit and the switching panel is used, the structure of the uninterruptible power supply apparatus is different from that of an uninterruptible power supply apparatus used as a single system and has a bypass circuit incorporated therein.

Figure 9:
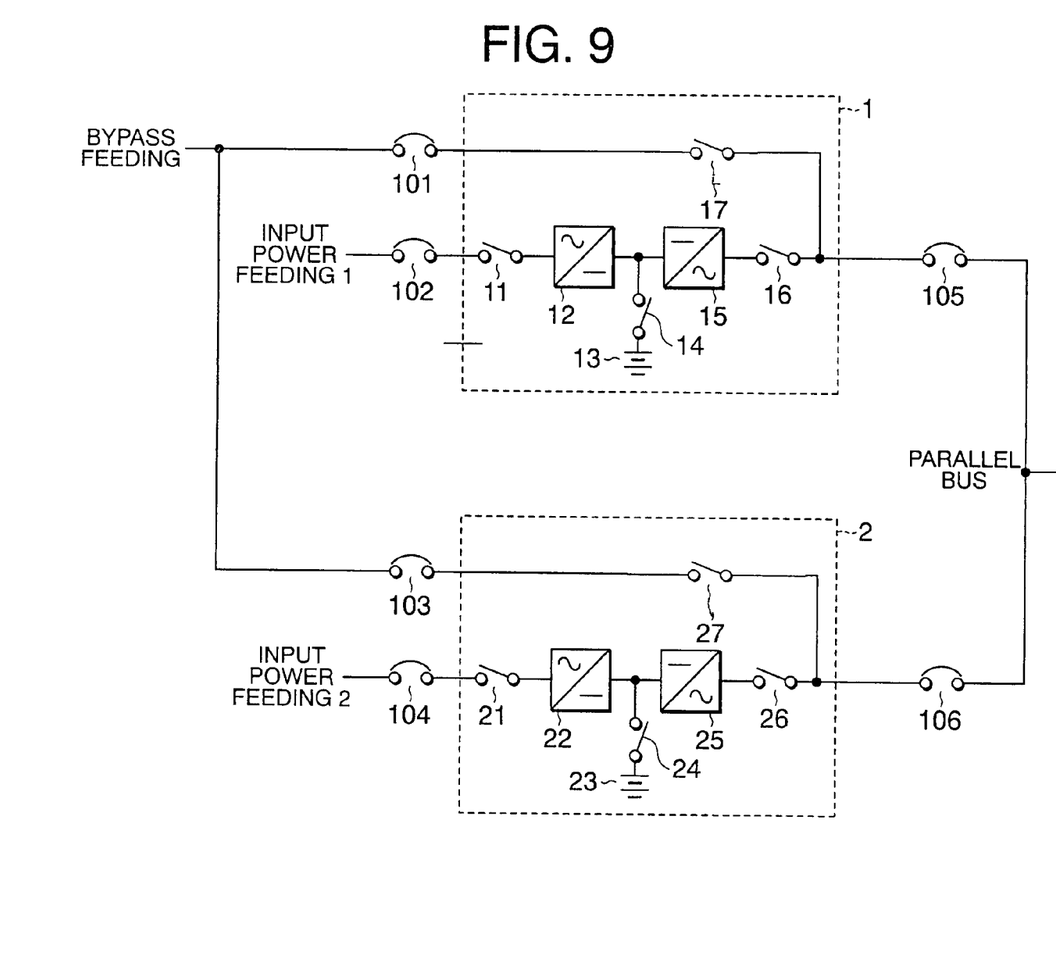
FIG. 9 is a block diagram showing a parallel operational apparatus for the known uninterruptible power supply apparatuses, to which Embodiments 1 to 5 of the present invention are applied.

In contrast to this, FIG. 9 shows a structure in which the uninterruptible power supply apparatuses, each being used as a single system and having a bypass circuit incorporated therein, are operated in parallel. Respective uninterruptible power supply apparatuses 1 and 2 can feed power using an inverter and a bypass power source as a single apparatus. When a load is small at the initial location of the uninterruptible power supply apparatus and the capacity is sufficient with one uninterruptible power supply apparatus, only the uninterruptible power supply apparatus 1 is provided. Then, when an additional load is provided and the capacity corresponding to two uninterruptible power supply apparatuses is required, the uninterruptible power supply apparatus 2 is added thereto. Thus, an initial investment cost can be suppressed.

According to the structure shown in FIG. 9, the respective uninterruptible power supply apparatuses 1 and 2 include the same structure as shown in FIG. 6. Although reference numerals in the tens are used for the uninterruptible power supply apparatus 1, the structure of the uninterruptible power supply apparatus 2 is denoted by using corresponding reference numerals in the twenties. In FIG. 9, when an operational mode of the uninterruptible power supply apparatuses 1 and 2 is changed from bypass feeding to inverter feeding, if the respective uninterruptible power supply apparatuses are separately changed from the bypass feeding to the inverter feeding, one of the apparatuses provides inverter feeding and at least one different apparatus provides the bypass feeding.

In particular, in the case where an operation using a switch and the like for the inverter feeding is conducted by an operator for only the uninterruptible power supply apparatus 1, and the uninterruptible power supply apparatus 2 remains in a bypass feeding state without operation, an inverter feeding state continues in the uninterruptible power supply apparatus 1 and the bypass feeding state continues in the uninterruptible power supply apparatus 2. Thus, an inverter output of the uninterruptible power supply apparatus 1 and the bypass power supply output of the uninterruptible power supply apparatus 2 overlap. At this time, when the bypass power supply output of the uninterruptible power supply apparatus 2 is different from the inverter output voltage of the uninterruptible power supply apparatus 1, an overcurrent is caused in the inverter of the uninterruptible power supply apparatus 1 because of the different voltage outputs.

Thus, when the operational mode of the uninterruptible power supply apparatuses 1 and 2 is changed from bypass feeding to inverter feeding, AC switches 17 and 27 are simultaneously turned off in the uninterruptible power supply apparatuses 1 and 2, and it is necessary to simultaneously supply power from the inverters 15 and 25. Therefore, in general, there is a problem that a separate circuit for producing a common instruction is required.

SUMMARY OF THE INVENTION

The present invention has been made to solve the above problem, and therefore has an object thereof to provide a parallel operation method for an uninterruptible power supply apparatus, which is also capable of conducting a parallel non-redundancy operation of respective uninterruptible power supply apparatuses, each being used as a single system and having a bypass circuit incorporated therein without using an additional common circuit.

A parallel operation method for an uninterruptible power supply apparatus according to the present invention relates to a method of operating in parallel a plurality of uninterruptible power supply apparatuses, each having two operation modes including a bypass feeding mode for feeding power from the bypass power source through the AC switch when the inverter is stopped and an inverter feeding mode for supplying power from the inverter by turning off the AC switch. The method is characterized in that an off instruction for the AC switch is produced in the respective apparatuses, which are operated in parallel. The off instruction is produced based on detection of a coincidence of a pattern of the bypass feeding signal, which is active during bypass feeding, and a pattern of a ready signal which becomes active when the inverter feeding is ready. Thus, the respective uninterruptible power supply apparatuses in the bypass feeding simultaneously turn off the AC switches. In short, power can be fed simultaneously supply power from the inverters to the load through the switches. As a result, parallel non-redundancy operation of the uninterruptible power supply apparatuses, each being used as a single system and having a bypass circuit incorporated therein, is possible without using an additional common circuit.

DETAILED DESCRIPTION OF THE PREFERRED EMBODIMENTS

First, according to the present invention, uninterruptible power supply apparatuses 1 and 2, each being used as a single system and having a bypass circuit incorporated therein as shown in FIG. 9, are employed as uninterruptible power supply apparatuses to be operated in parallel. Hereinafter, a parallel operation method for an uninterruptible power supply apparatus according to respective embodiments of the present invention will be described with reference to the drawings.

Embodiment 1

Figure 1:
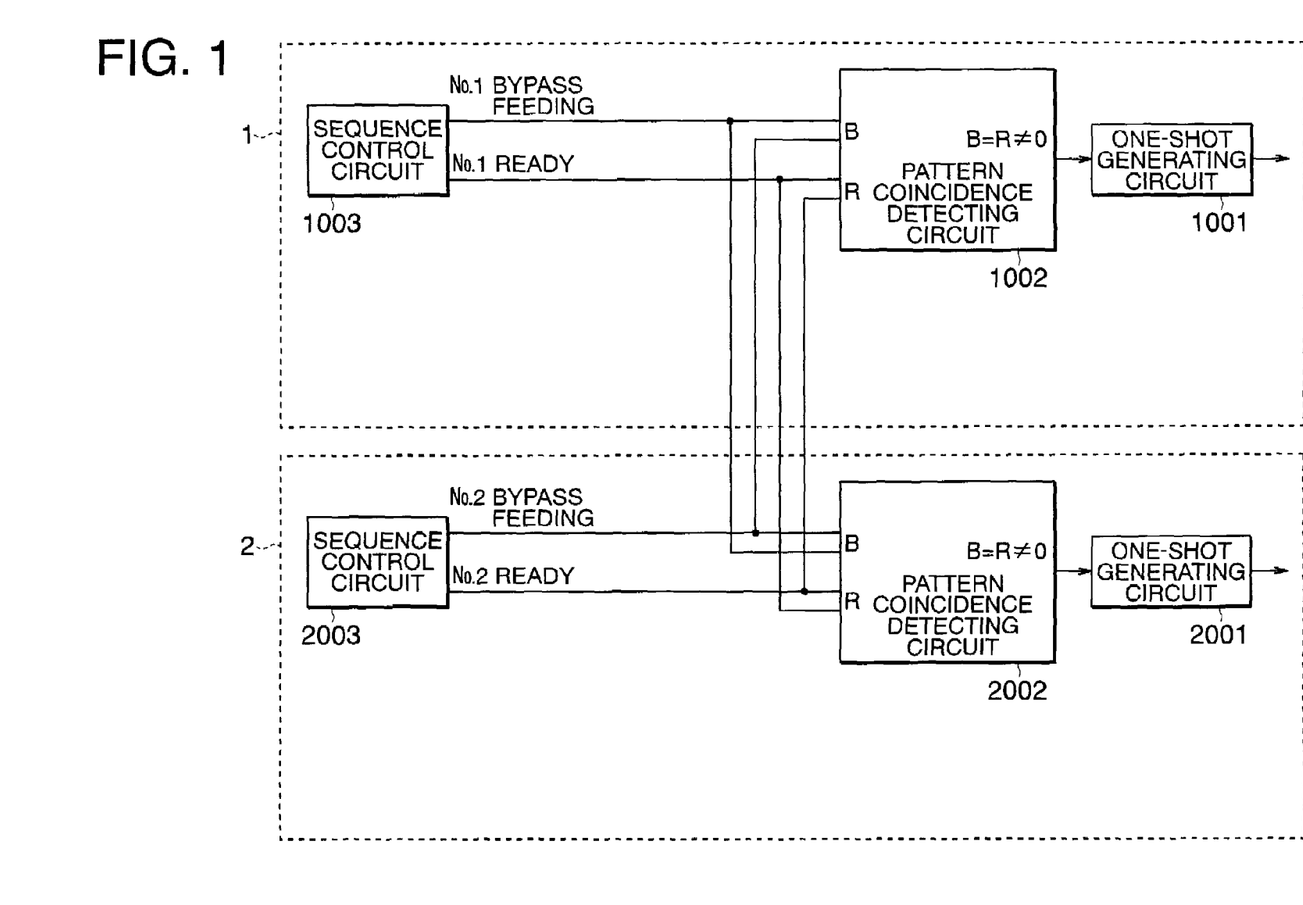
FIG. 1 is a block diagram showing trigger signal producing circuits for producing a trigger signal for providing an inverter feeding start instruction, which are incorporated in uninterruptible power supply apparatuses shown in FIG. 9, for explaining a parallel operation method for an uninterruptible power supply apparatus according to Embodiment 1 of the present invention.

FIG. 1 is a block diagram for explaining a parallel operation method for an uninterruptible power supply apparatus according to Embodiment 1 of the present invention and showing trigger signal producing circuits for producing trigger signals for providing an inverter feeding start instruction, and which are incorporated in the uninterruptible power supply apparatuses 1 and 2 shown in FIG. 9. Reference numerals between one thousand and two thousand denote components of the uninterruptible power supply apparatus 1 and reference numerals in the two thousands denote components of the uninterruptible power supply apparatus 2. Reference numerals 1001 and 2001 denote one-shot generating circuits for generating one-shot pulses, reference numerals 1002 and 2002 denote pattern coincidence detecting circuits, and reference numerals 1003 and 2003 denote sequence control circuits.

Next, the operation will be described. The one-shot generating circuits 1001 and 2001 are used for generating one-shot signals when the operational mode of the uninterruptible power supply apparatuses 1 and 2 are changed from bypass feeding to inverter feeding. In accordance with the one-shot signals, the uninterruptible power supply apparatuses 1 and 2 turn off AC switches 17 and 27, and cause inverters 15 and 25 to supply power to a load through the switches 16 and 26.

Two state signals are supplied from the sequence control circuits 1003 and 2003 to the pattern coincidence detecting circuits 1002 and 2002. One is a "bypass feeding" signal indicating a bypass feeding state, and the other is a "ready" signal indicating that preparation for changing the operational mode to the inverter feeding has been completed. For example, when an operation using a switch for inverter feeding is conducted by an operator of the uninterruptible power supply apparatus during bypass feeding, after the activation of the inverters is completed, output switches of the inverters are ready to be turned on, so that the "ready" signal becomes active.

When any one of "bypass feeding" signals supplied from the sequence control circuits of the uninterruptible power supply apparatuses 1 and 2 is active and the "bypass feeding" signal coincides with the "ready" signal for the respective uninterruptible power supply apparatuses, the pattern coincidence detecting circuits 1002 and 2002 produce outputs. In other words, according to the structure shown in FIG. 9, the pattern coincidence detecting circuits 1002 and 2002 produce active outputs, Cases 2 and 3 of Table 1. Case 1 indicates the case where two apparatuses are operated in parallel. Even when an operation using a switch for inverter feeding is conducted by an operator of the uninterruptible power supply apparatus during the bypass feeding, the bypass feeding continues until inverter feeding is conducted by both two apparatuses. Then, the pattern coincidence detecting circuits 1002 and 2002 produce the active outputs only after the operation is conducted for the two apparatuses. Thus, the uninterruptible power supply apparatuses 1 and 2 simultaneously turn off their AC switches, power is fed simultaneously from the inverters. In addition, the structure can be also applied without modification to the case where the operation is conducted with one uninterruptible power supply apparatus being stopped due to a small load capacity as in Cases 2 and 3. When only one uninterruptible power supply apparatus in bypass feeding outputs the "ready" signal, the operational mode is preferably changed separately from the bypass feeding to inverter feeding.

TABLE 1

| Case | Uninterruptible power supply apparatus 1 Bypass feeding | Uninterruptible power supply apparatus 1 Ready | Uninterruptible power supply apparatus 2 Bypass feeding | Uninterruptible power supply apparatus 2 Ready | State |
|---|---|---|---|---|---|
| 1 | ○ | ○ | ○ | ○ | Parallel operation of two apparatuses |
| 2 | ○ | ○ | 1 | 1 | Stop of uninterruptible power supply apparatus 2 |
| 3 | 1 | 1 | ○ | ○ | Stop of uninterruptible power supply apparatus 1 |

In Embodiment 1, although there is described the case where two uninterruptible power supply apparatuses shown in FIG. 9 are provided, the present invention can be similarly applied even in the case where the number of uninterruptible power supply apparatuses is three or more. In this case, it is preferable that the two state signals, the "bypass feeding" signal and the "ready" signal, is supplied from the sequence control circuits of the respective uninterruptible power supply apparatuses and a pattern coincidence is detected in the pattern coincidence detecting circuit of the respective uninterruptible power supply apparatuses.

As described above, according to Embodiment 1, a pattern coincidence between two state signals, the "bypass feeding" signal and the "ready" signal, is detected in the respective uninterruptible power supply apparatuses which are in parallel operation. Thus, the respective uninterruptible power supply apparatuses in bypass feeding simultaneously turn off the AC switches, and, power can be fed simultaneously from the inverters to the load. Therefore, parallel non-redundancy operation of the uninterruptible power supply apparatuses, each being used as a single system and having a bypass circuit incorporated therein, is also possible without using an additional common circuit.

Embodiment 2

In Embodiment 2, the following point is different from Embodiment 1. That is, in the structure shown in FIG. 9, the outputs of the "bypass feeding" signal and the "ready" signal in the uninterruptible power supply apparatuses 1 and 2 are interactive with auxiliary contacts of circuit breakers 105 and 106.

Figure 2:
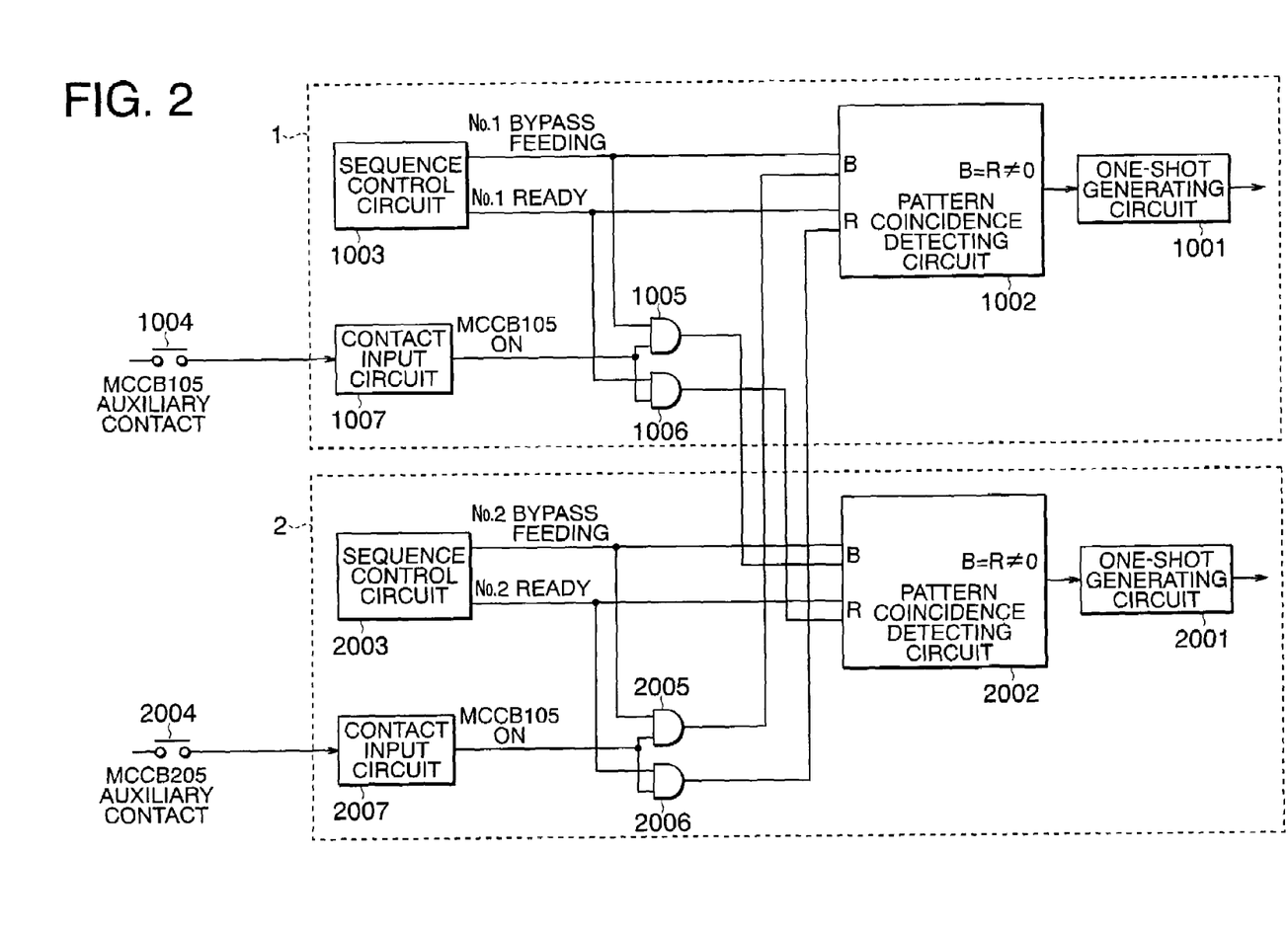
FIG. 2 is a diagram for explaining a parallel operation method for an uninterruptible power supply apparatus according to Embodiment 2 of the present invention, the diagram corresponding to FIG. 1.

Hereinafter, Embodiment 2 of the present invention will be described based on FIG. 2 with reference to FIG. 9. FIG. 2 is a block diagram showing a trigger signal producing circuit for explaining a parallel operation method for an uninterruptible power supply apparatus according to Embodiment 2 of the present invention. In FIG. 2, portions added to the structure of Embodiment 1 as shown in FIG. 1 will be described below. Reference numeral 1004 denotes an auxiliary contact of the circuit breaker 105 shown in FIG. 9, and, similarly, reference numeral 2004 denotes an auxiliary contact of a circuit breaker 106. The contacts are turned on/off in response to on/off operations of the circuit breakers. Reference numerals 1005, 1006, 2005, and 2006 denote AND circuits. Reference numerals 1007 and 2007 denote contact input circuits which produce active outputs when the contacts are turned on.

The purpose of Embodiment 2 is to prevent the outputs of the "bypass feeding" signal and the "ready" signal to the apparatus which is not being checked, that is, the apparatus which continues the power feeding to the load, when either of the uninterruptible power supply apparatuses 1 and 2 is being checked. For example, the case is considered in FIG. 9, where the uninterruptible power supply apparatus 1 is operated, the circuit breaker 105 is in an on state, the uninterruptible power supply apparatus 2 is being checked, and the circuit breaker 106 is in an off state. At this time, when the bypass feeding mode is set in the uninterruptible power supply apparatus 2 for checking, the "bypass feeding" signal is generated in the uninterruptible power supply apparatus 2 as in the case of Embodiment 1. Thus, even if it is desired that the operational mode of only the uninterruptible power supply apparatus 1 be changed from bypass feeding to inverter feeding, since the output of the pattern coincidence detecting circuit 1002 does not become active, a problem occurs in that inverter feeding cannot be conducted.

Therefore, according to Embodiment 2, the "bypass feeding" signal and the "ready" signal are output from the first apparatus only when the output circuit breaker of a first apparatus is in an on state. In order to realize this, when the circuit is the uninterruptible power supply apparatus 1, a signal at the auxiliary contact 1004 of the output circuit breaker 105 in the first apparatus is supplied to the contact input circuit 1007, and a "circuit breaker 105 on" signal as the output thereof is supplied to the AND circuits 1005 and 1006. The outputs of the AND circuits 1005 and 1006 are output as the "bypass feeding" signal and the "ready" signal to the two apparatuses. Thus, during checking, the "bypass feeding" signal and the "ready" signal are not output to the uninterruptible power supply apparatus which feeds power to the load.

As described above, according to Embodiment 2, two state signals, the "bypass feeding" signal and the "ready" signal, are supplied from the respective uninterruptible power supply apparatuses which are in parallel operation and a pattern coincidence therebetween is detected in the respective uninterruptible power supply apparatuses. Thus, the respective uninterruptible power supply apparatuses in the bypass feeding simultaneously turn off their AC switches, and power can be fed simultaneously from the inverters to the load. In addition, when a first apparatus is being checked, the outputs of unnecessary signals to a different apparatus can be prevented.

Embodiment 3

In Embodiment 3, the following point is different from Embodiment 2. That is, in the structure shown in FIG. 9, the outputs of the "bypass feeding" signal and the "ready" signal from a different apparatus are interactive with auxiliary contacts of circuit breakers 105 and 106.

Figure 3:
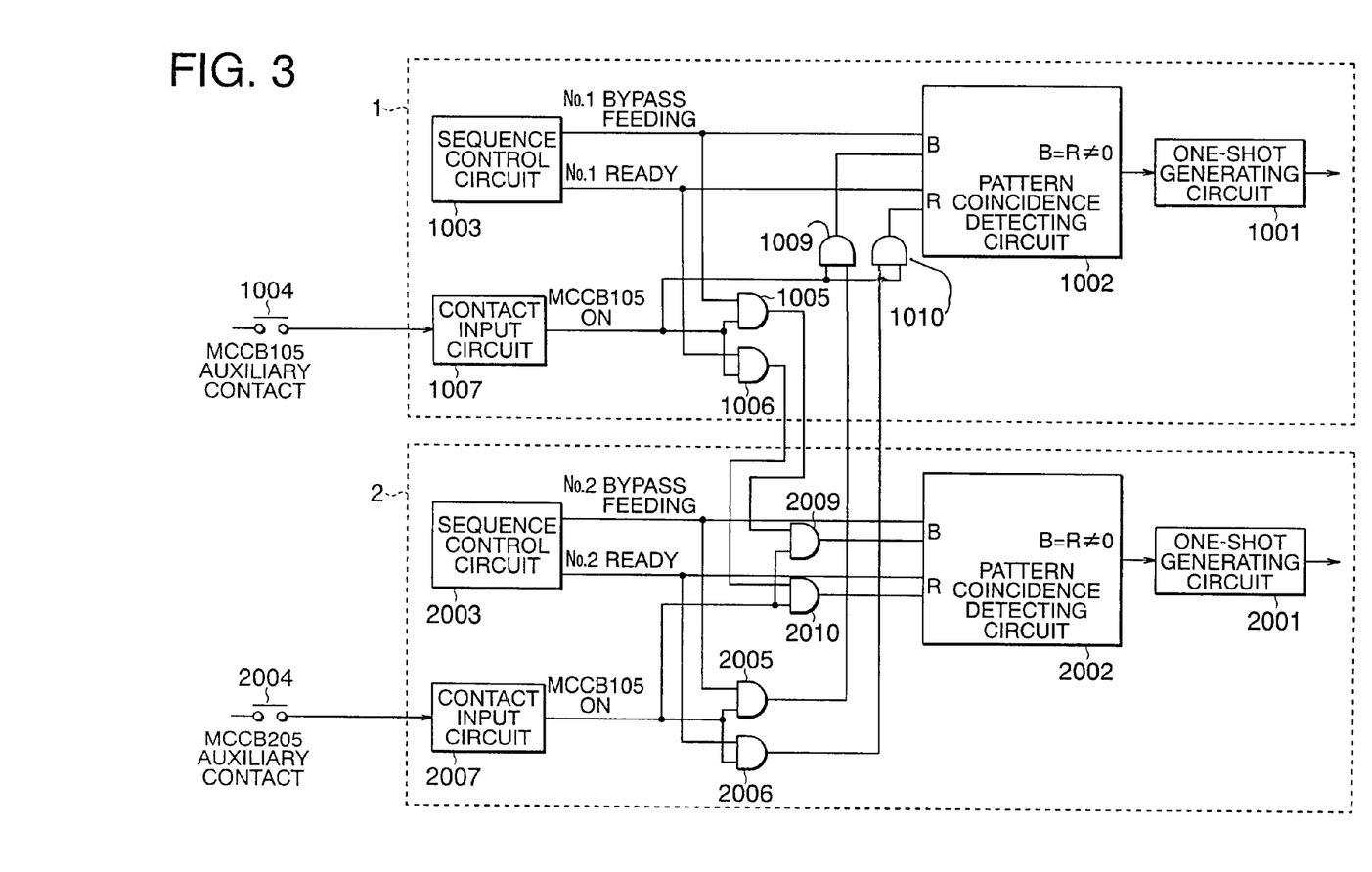
FIG. 3 is a diagram for explaining a parallel operation method for an uninterruptible power supply apparatus according to Embodiment 3 of the present invention, the diagram corresponding to FIG. 1.

Hereinafter, Embodiment 3 of the present invention will be described based on FIG. 3 with reference to FIG. 9. FIG. 3 is a block diagram showing a trigger signal producing circuit for explaining a parallel operation method for an uninterruptible power supply apparatus according to Embodiment 3 of the present invention. In FIG. 3, portions added to the structure of Embodiment 2 as shown in FIG. 2 are AND circuits denoted by reference numerals 1009, 1010, 2009, and 2010.

The purpose of Embodiment 3 is to change the operational mode of the uninterruptible power supply apparatus which is being checked, from the bypass feeding to the inverter feeding, so that check adjustment is possible, regardless of the operational mode of the uninterruptible power supply apparatus which continues feeding power to the load, when either of the uninterruptible power supply apparatuses 1 and 2 is being checked. For example, the case is considered in FIG. 9, where the uninterruptible power supply apparatus 1 is operated, the circuit breaker 105 is in an on state, the uninterruptible power supply apparatus 2 is being checked, and the circuit breaker 106 is in an off state. At this time, when the bypass feeding is conducted in the uninterruptible power supply apparatus 1, even if it is desired that the operational mode of the uninterruptible power supply apparatus 2 be changed from the bypass feeding to the inverter feeding for checking, the "bypass feeding" signal is generated in the uninterruptible power supply apparatus 1 as in the case of Embodiment 1. Thus, even if it is desired that the operational mode of only the uninterruptible power supply apparatus 2 be changed from the bypass feeding to the inverter feeding, since the output of the pattern coincidence detecting circuit 2002 does not become active, a problem occurs that the inverter feeding cannot be conducted.

Therefore, according to Embodiment 3, the "bypass feeding" signal and the "ready" signal are output only when the output circuit breaker of a first apparatus is in an on state. In order to realize this, when the circuit is described for the uninterruptible power supply apparatus 1, a signal at the auxiliary contact 1004 of the output circuit breaker 105 in the first apparatus is supplied to the contact input circuit 1007, and a "circuit breaker 105 on" signal is supplied to the AND circuits 1009 and 1010. The outputs of the AND circuits 1009 and 1010 are utilized as the "bypass feeding" signal and the "ready" signal of the apparatus 1. Thus, during the check, the uninterruptible power supply apparatus 1 does not receive the "bypass feeding" signal and the "ready" signal output from the uninterruptible power supply apparatus 1 which supplies the power to the load.

As described above, according to Embodiment 3, two state signals, the "bypass feeding" signal and the "ready" signal, are received from the respective uninterruptible power supply apparatuses which are in parallel operation and a pattern coincidence therebetween is detected in the respective uninterruptible power supply apparatuses. Thus, the respective uninterruptible power supply apparatuses in the bypass feeding simultaneously turn off their AC switches, and power can be fed simultaneously from the inverters to the load. When a first apparatus is being checked, the outputs of unnecessary signals to the different apparatus can be prevented. In addition, the changing of the operational mode of the checked apparatus from the bypass feeding to the inverter feeding can be tested regardless of the state of the different apparatus.

Embodiment 4

The case where the operational mode is changed from the bypass feeding to the inverter feeding is described in Embodiment 1. In Embodiment 4, the case where the operational mode is changed from the inverter feeding to the bypass feeding will be described.

Figure 4:
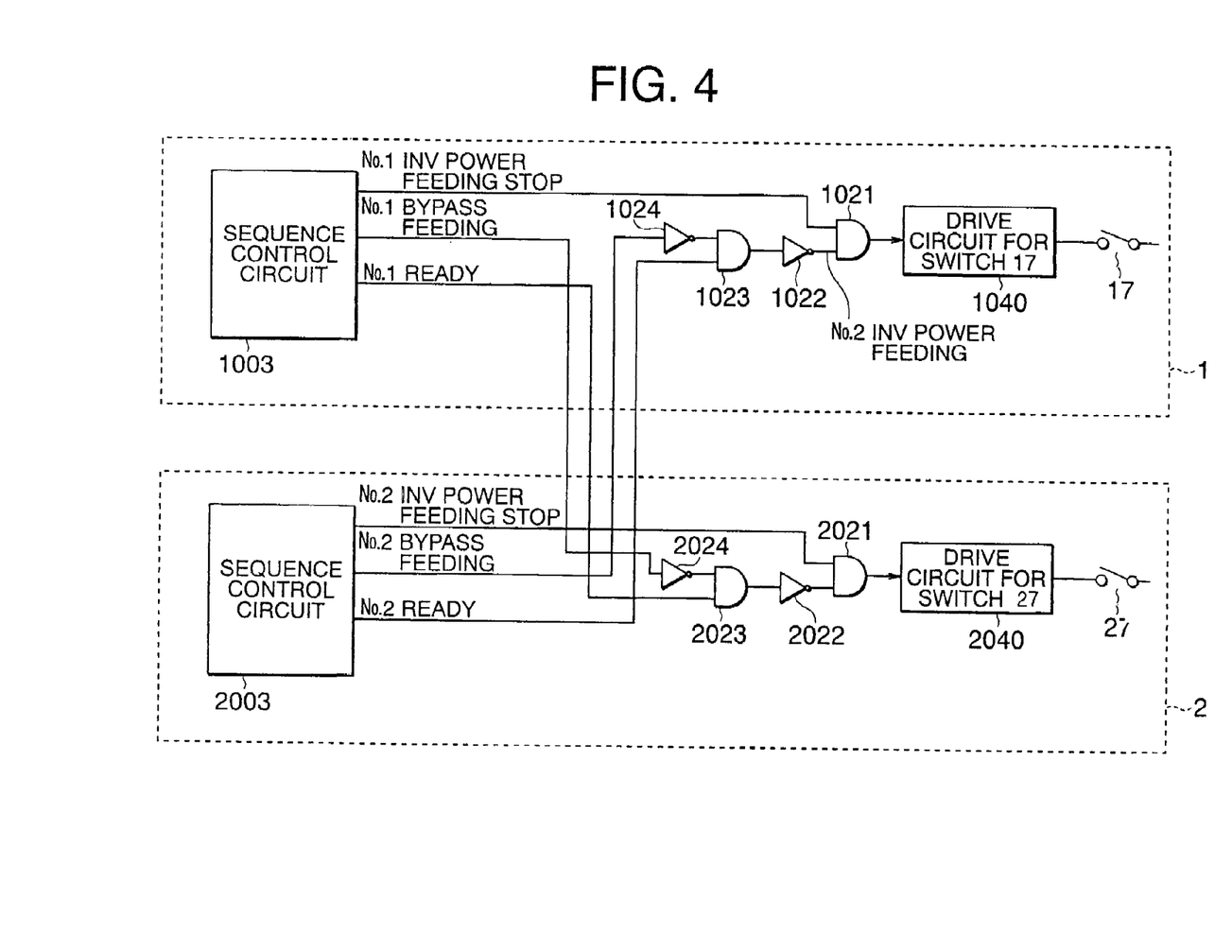
FIG. 4 is a diagram for explaining a parallel operation method for an uninterruptible power supply apparatus according to Embodiment 4 of the present invention, the diagram corresponding to FIG. 1.

Hereinafter, Embodiment 4 of the present invention will be described based on FIG. 4 with reference to FIG. 9. FIG. 4 is a block diagram showing a trigger signal producing circuit for explaining a parallel operation method for an uninterruptible power supply apparatus according to Embodiment 4 of the present invention, and also showing a portion for driving the AC switches 17 and 27, which are incorporated in the uninterruptible power supply apparatuses 1 and 2 shown in FIG. 9 and are turned on during the bypass feeding. In FIG. 4, reference numerals 1040 and 2040 denote switch drive circuits, 1003 and 2003 denote sequence control circuits, 1021, 1023, 2021, and 2023 denote AND circuits, and 1022, 1024, 2022, and 2024 denote inverting circuits. The other portions are the same as those in Embodiment 1 shown in FIG. 1 and therefore omitted here.

In FIG. 9, it is required that the AC switch 17 in the uninterruptible power supply apparatus 1 be turned on in a single operation when the inverter 15 is stopped or the switch 16 is turned off, stopping the inverter feeding to the load. However, in parallel operation, even if the inverter feeding is stopped, when the inverter feeding is conducted in the uninterruptible power supply apparatus 2, the AC switch 17 is preferably turned off. Only when the inverter feeding is stopped also in the uninterruptible power supply apparatus 2, the AC switch 17 is preferably turned on.

In order to realize this, first, an "inverter feeding stop: INV power feeding stop" signal is produced. The "ready" signal used in Embodiment 1 is made an active signal during a period from the completion of activation preparation of the inverter until the stopping of the inverter. Thus, it is combined with the "bypass feeding" signal so that a state indicated in Table 2 can be obtained. In other words, a "No. 2 INV power feeding stop" signal can be produced through the AND circuits 1021 and 1023 and the inverting circuits 1022 and 1024.

TABLE 2

| | Bypass feeding | Ready | Power feeding state | Apparatus state |
|---|---|---|---|---|
| 1 | ○ | | 1 | Bypass feeding | — |
| 2 | ○ | ○ | Bypass feeding | Completion of activation preparation of inverter |
| 3 | 1 | ○ | Inverter feeding | — |
| 3 | 1 | 1 | No power feeding | — |

To the AND circuit 1021, a "No. 1 INV power feeding stop" signal, indicating the stopping of power feeding from the inverter in the uninterruptible power supply apparatus 1 and the "No. 2 INV power feeding stop" signal indicating the stopping of power feeding from the inverter in the uninterruptible power supply apparatus 2 are preferably supplied to drive the AC switch 17 through the switch drive circuit 1040 in accordance with the output of the AND circuit. 1021. Thus, when no apparatus provides the inverter feeding, the AC switch 17 can be turned on.

As described above, according to Embodiment 4, two state signals, the "bypass feeding" signal and the "ready" signal, are supplied from the respective uninterruptible power supply apparatuses which are in parallel operation and a pattern coincidence therebetween is detected in the respective uninterruptible power supply apparatuses. Thus, the respective uninterruptible power supply apparatuses in the bypass feeding simultaneously turn off the AC switches, and power can be fed simultaneously from the inverters to the load. In addition, the "INV power feeding stop" signals are produced from the two state signals, the "bypass feeding" signal and the "ready" signal, and the AC switches are turned on if no apparatus conducts the inverter feeding. Thus, it can be prevented that the respective power feeding modes are different from each other in a parallel system including the uninterruptible power supply apparatuses in which a bypass circuit is respectively incorporated.

Embodiment 5

In Embodiment 5, the following point is different from Embodiment 4. That is, a failure detecting circuit is added for detecting whether the "bypass feeding" signal output from a first apparatus is an abnormal signal through comparison with a similar signal from a different apparatus.

Figure 5:
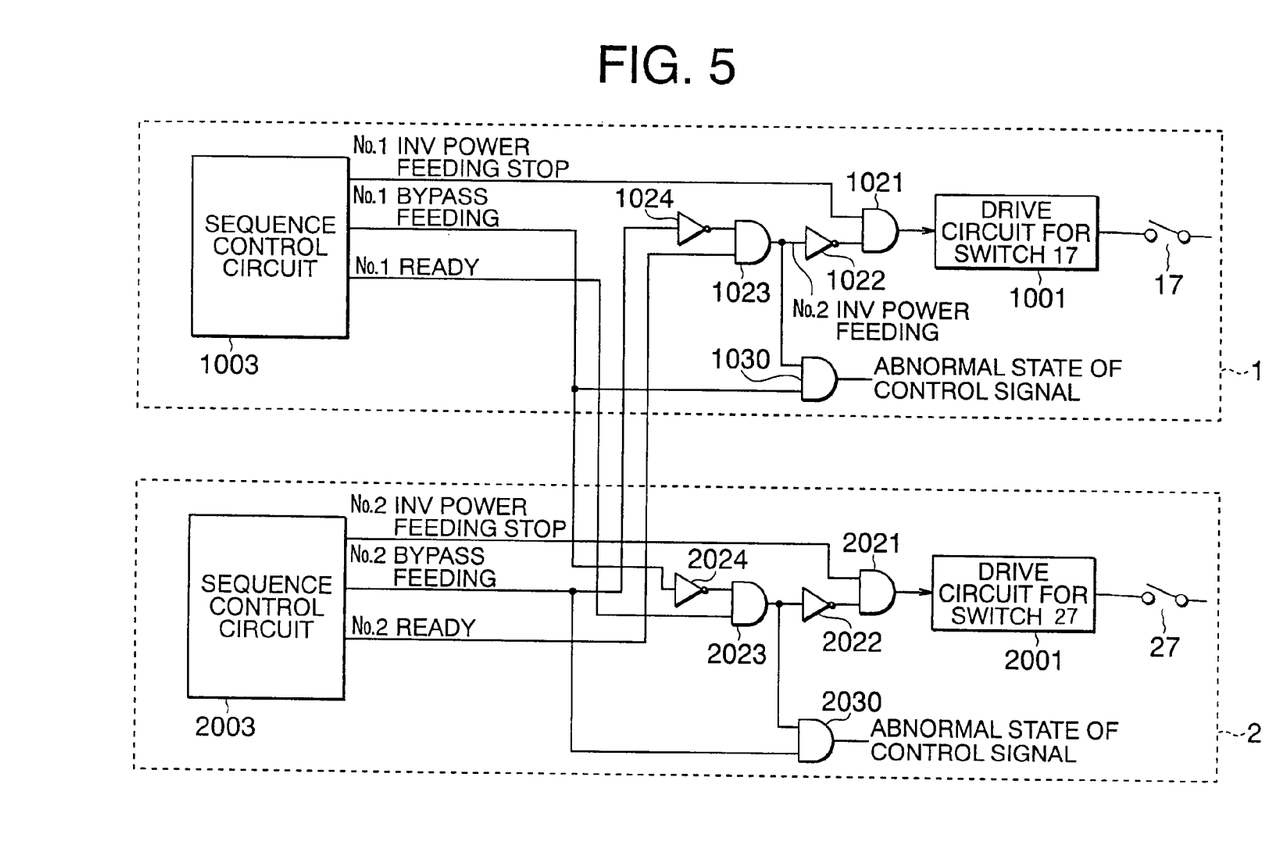
FIG. 5 is a diagram for explaining a parallel operation method for an uninterruptible power supply apparatus according to Embodiment 5 of the present invention, the diagram corresponding to FIG. 1.

Hereinafter, Embodiment 5 of the present invention will be described based on FIG. 5 with reference to FIG. 9. FIG. 5 is a block diagram showing a trigger signal producing circuit for explaining a parallel operation method for an uninterruptible power supply apparatus according to Embodiment 5 of the present invention. In FIG. 5, portions added to the structure shown in FIG. 4 are only failure detecting circuits 1030 and 2030.

Describing with reference to the uninterruptible power supply apparatus 1, the "bypass feeding" signal is not output in a first apparatus even in the case where the other apparatus conducts the inverter feeding alone. Thus, when the different apparatus outputs the signal indicating the "inverter feeding" state and the "bypass feeding" signal is output in the first apparatus, it is determined that a control signal in the first apparatus is an abnormal signal. A specific circuit is composed of an AND circuit denoted by reference numeral 1030.

As described above, according to Embodiment 5, two state signals, the "bypass feeding" signal and the "ready" signal, are received from the respective uninterruptible power supply apparatuses which are in parallel operation and a pattern coincidence therebetween is detected in the respective uninterruptible power supply apparatuses. Thus, the respective uninterruptible power supply apparatuses in the bypass feeding simultaneously turn off their AC switches, and power can be fed simultaneously from the inverters to the load. In addition, the "INV power feeding stop" signals are produced from the two state signals, the "bypass feeding" signal and the "ready" signal, and the AC switches are turned if no apparatus conducts the inverter feeding. Thus, it can be prevented that the respective power feeding modes are different from each other in a parallel system including the uninterruptible power supply apparatuses in which a bypass circuit is respectively incorporated. Further, whether or not the "bypass feeding" signal from a first apparatus is an abnormal signal can be detected through comparison with a similar signal from a different apparatus.

The invention claimed is:

1. A method of operating in parallel a plurality of uninterruptible power supply apparatuses, each power supply apparatus having two operational modes, a bypass feeding mode for supplying power through an AC switch when an inverter in the power supply apparatus is not operating and an inverter feeding mode for supplying power from the inverter and turning off the AC switch, the method including producing an off-instruction for the AC switches in the respective uninterruptible power supply apparatuses in response to detection of coincidence of a bypass feeding signal, which is active during operation of the bypass feeding mode, and a ready signal, which becomes active when the inverter feeding mode is ready for operation, and supplying to a second of the uninterruptible power supply apparatuses the bypass feeding signal and the ready signal which are output from a first of the uninterruptible power supply apparatuses only when an on/off state signal from an output switch in the first uninterruptible power supply apparatus is in an on state.

2. A method of operating in parallel a plurality of uninterruptible power supply apparatuses, each power supply apparatus having two operational modes, a bypass feeding mode for supplying power through an AC switch when an inverter in the power supply apparatus is not operating and an inverter feeding mode for supplying power from the inverter and turning off the AC switch, the method including
producing an off-instruction for the AC switches in the respective uninterruptible power supply apparatuses in response to detection of coincidence of a bypass feeding signal, which is active during operation of the bypass feeding mode, and a ready signal, which becomes active when the inverter feeding mode is ready for operation; and
supplying to a first of the uninterruptible power supply apparatuses the bypass feeding signal and the ready signal output from a second of the uninterruptible power supply apparatuses only when on/off state signals from respective output switches in the first and second uninterruptible power supply apparatuses are both in an on state.

3. A method operating in parallel a plurality of uninterruptible power supply apparatuses, each power supply apparatus having two operational modes, a bypass feeding mode for supplying power through an AC switch when an inverter in the power supply apparatus is not operating and an inverter feeding mode for supplying power from the inverter and turning off the AC switch, the method including:
producing an off-instruction for the AC switches in the respective uninterruptible power supply apparatuses in response to detection of coincidence of a bypass feeding signal, which is active during operation of the bypass feeding mode, and a ready signal, which becomes active when the inverter feeding mode is ready for operation; and
in the respective uninterruptible power supply apparatuses which are operated in parallel,
making the ready signal active during a period from completion of preparation of the inverter for the inverter feeding mode until stopping of the inverter feeding mode,
generating an inverter feeding stop signal indicating stopping of the inverter feeding mode based on the ready signal and the bypass feeding signal, and
producing an on-instruction for the AC switches when none of the uninterruptible power supply apparatuses is operating in the inverter feeding mode.

4. The method according to claim 3, including detecting an abnormal state of the bypass feeding signal of a first of the uninterruptible power supply apparatuses based on a combination of the bypass feeding signal and the ready signal of a second of the uninterruptible power supply apparatuses.

* * * * *

UNITED STATES PATENT AND TRADEMARK OFFICE
CERTIFICATE OF CORRECTION

PATENT NO.       : 7,061,141 B2
APPLICATION NO.  : 10/237081
DATED            : June 13, 2006
INVENTOR(S)      : Yuushin Yamamoto It is certified that error appears in the above-identified patent and that said Letters Patent is hereby corrected as shown below:

On Title page item (73) Assignee: "., Mitsubishi Denki Kabushiki Kaisha, Tokyo (JP)" should read -- Toshiba Mitsubishi-Electric Industrial Systems Corporation, Tokyo (JP) --.

Signed and Sealed this

Twentieth Day of May, 2008

JON W. DUDAS
*Director of the United States Patent and Trademark Office*